Patented Mar. 26, 1935

1,996,001

UNITED STATES PATENT OFFICE 1,996,001

RUBBER SOLVENT

William Seaman, Brooklyn, N. Y., and George L. Matheson, Elizabeth, N. J., assignors to Standard Oil Development Company, a corporation of Delaware No Drawing. Application July 23, 1931,
Serial No. 552,796

8 Claims. (Cl. 134—17)

This invention relates to new and improved solvents for rubber, especially solvents comprising organic sulfides obtained from petroleum, and to rubber solutions and compositions prepared with the aid of such solvents.

The liquid organic sulfides, including both the disulfides and the thio-ethers, and characterized (in contrast with the mercaptans) by being substantially non-corrosive, possess excellent properties as solvents for rubber. Solutions of rubber in the above liquid organic sulfides are less viscous than solutions containing the same concentration of rubber in carbon disulfide. The mixtures of the organic sulfides as prepared from the mercaptans occurring in the distillation or destructive distillation products of petroleum and other naturally occurring hydrocarbons are especially suitable as rubber solvents, and these mercaptans provide very convenient and cheap sources for such solvents. A method of preparing the disulfides is described in the co-pending application No. 537,175 filed May 13, 1931 of Herbert G. M. Fischer, in which a spent soda solution used for treating "sour" or corrosive cracked distillates is subjected to a carefully limited treatment with oxygen, whereby a complex mixture of disulfides is obtained. This is illustrated by the following example:

Example 1

A distillate of 90 to 95° Baumé, boiling below 300° F., and containing 0.18 to 0.3% sulfur, from cracked high sulfur gas oil, is treated with 0.1 to 0.2 volumes of a 3 to 6% aqueous solution of caustic soda at 80 pounds pressure. The sulfur content of the naphtha is reduced by this treatment to 0.02 to 0.03%, and the caustic soda solution contains a mixture of mercaptides averaging about ethyl mercaptides in molecular weight. The spent soda solution from the above treatment is heated to about 210° F. with steam, and preferably within the limits of 100 to 400° F., and without reduction in pressure is thoroughly mixed with a carefully regulated amount of oxygen. The amount of oxygen used is desirably somewhat less than that required for the complete regeneration of the caustic soda solution. Under these conditions the reaction proceeds rapidly and smoothly and the oxygen is entirely used up.

After the reaction of the spent soda solution with oxygen the resulting mixture is cooled to substantially atmospheric temperature, and is passed into a relatively large drum where it is permitted to separate into two layers. The bottom layer consists almost entirely of caustic soda with a very small amount of unconverted mercaptans or other sulfur compounds, and the upper layer consists almost entirely of di-sulfides. The di-sulfide mixture secured in this operation boiled between 275 and 340° F., contained 52.3% sulfur by weight, and had a specific gravity of 0.982. These di-sulfides may be further purified by suitable methods for the removal of any residual traces of mercaptans or other corrosive sulfur compounds. An improved method of preparing the thio-ethers is described in the co-pending application No. 585,156 filed Jan. 6, 1932 of Seaman and Huffman, in which mercaptans, recovered from a similar spent soda solution by steam distillation, are passed in vapor form over catalysts, and a product containing thio-ethers and hydrogen sulfide is secured. This is illustrated by the following example:

Example 2

18 cc. of vaporized mercaptan, boiling between 30° C. and 40° C., and prepared by steam distillation of spent soda used for treating a sour light naphtha, are passed per hour at about 305° C. over 100 cc. of a catalyst consisting of precipitated cadmium sulphide distributed on activated charcoal. 56.6% of thio-ethers are secured in the product, based on the amount of mercaptans used, with 2.3% loss due to gas formation.

A special feature of these solvents is that freshly prepared rubber solutions, particularly those prepared with non-macerated rubber, show a marked decrease in viscosity upon standing, for example, a solution of 0.5 gram of unvulcanized rubber in 5 cc. of dimethyl monosulfide possesses a viscosity when freshly prepared about equal to that of glycerine, but after standing for some days the solution becomes clear and limpid and is as freely mobile as water or kerosene.

Dimethyl disulfide, diethyl disulfide, di-n-propyl disulfide, methyl, ethyl and n-propyl thio-ethers have been found individually and in admixture to possess desirable solvent properties for rubber. Similarly, other symmetrical or mixed alkyl, aryl, or alkyl-aryl disulfides or thio-ethers are advantageous for this purpose. The exact composition of the complex mixtures obtained in the above processes for the production of disulfides and thio-ethers from petroleum mercaptans is not known, and indeed the analysis of these mixtures is very difficult. However, it is unnecessary to separate these mixtures into ultimate pure compounds, and a simple fractionation to secure mixtures of any desired volatility and boiling range available is sufficient to produce suitable rubber solvents.

These solvents may be used in admixture with other suitable solvents for rubber, such as benzine, carbon disulfide, chloroform, carbon tetrachloride, toluene, and other solvents, and are generally miscible therewith.

Solutions of rubber in these solvents may be used advantageously for preparing cold dipped rubber goods, and such goods may be conveniently vulcanized in solutions of sulfur monochloride in the disulfides since these solvents have also been found to dissolve sulfur monochloride without reaction.

The solutions of rubber in the disulfides or thio-ethers etc. may also be used as rubber cements or as carriers for adding rubber as a plasticizer, to lacquers, varnishes and the like. In general the disulfide solutions of rubber may be used advantageously for practically all purposes to which solutions of rubber in other solvents are now put.

The disulfides, more particularly the heavier fractions boiling above 300° F., may be used in the reclamation of vulcanized rubber. Vulcanized rubber to be reclaimed may be first subjected to the usual treatments with caustic soda at elevated temperatures and pressures and the partially desulfurized product is then treated with the disulfides at suitable temperatures. The vulcanized rubber may also be macerated and then treated directly with our disulfides. This treatment may be accelerated by the use of elevated temperatures with pressures sufficient to maintain the disulfides in liquid phase. The caustic soda and the disulfide treatments may be combined, and in this case it is advantageous to use suitable mixing means for maintaining thorough contact between the rubber and the two reagents.

The higher boiling normally solid organic sulfides may also be used to form solid solutions with rubber, and possess advantages as plasticizers in such uses.

It is to be understood that the term "rubber solutions" mentioned herein is not to be limited to true solutions in the physico-chemical sense, but that the term is to be interpreted in the broader sense common to the rubber industry, and includes colloidal solutions such as liquid sols, gels, emulsions, or combinations thereof whatever the nature of the liquid or viscous semi-liquid product secured on addition of rubber to the suitable "solvents", according to the particular concentration and to the characteristics of the rubber used.

It is to be understood that the preparation of solutions of rubber with these improved solvents may be accomplished by any of the customary methods, and that in general both pre-working or "milling" of the rubber, and maceration or kneading of the mixture of rubber and solvent, are advantageous.

The term "organic sulfide" used herein includes sulfides, disulfides (other than carbon disulfide), thio-ethers, and other sulfur derivatives of mercaptans.

This invention is not to be limited to any specific example given herein for purposes of illustration, or to any particular compound which may have been mentioned, but only to the following claims in which we wish to claim all novelty inherent in the invention as broadly as the prior art permits.

We claim:

1. A composition of matter comprising rubber and a sufficient amount of an alkyl disulfide having a boiling point not higher than that of di-n-propyl disulfide to dissolve at least a substantial proportion of the rubber.

2. A composition of matter comprising rubber and a sufficient amount of an alkyl thio-ether having a boiling point not higher than that of di-n-propyl thio-ether to dissolve at least a substantial proportion of the rubber.

3. A composition of matter comprising a solution of rubber in a relatively larger amount of a liquid organic sulphide selected from the class consisting of alkyl thioethers and polysulphides.

4. A composition of matter comprising a solution containing rubber and a relatively larger amount of an organic sulphide selected from the class consisting of alkyl thioethers and polysulphides.

5. A composition of matter comprising a solution of rubber in a liquid solvent comprising a substantial proportion of a mixture of alkyl sulphides corresponding to a mixture of mercaptans derived from sour petroleum oils.

6. A composition of matter comprising a solution of rubber in a liquid solvent comprising a substantial proportion of a mixture of disulphides prepared by limited dehydrogenation of a mixture of the mercaptans removable from a sour naphtha with an aqueous alkali.

7. A composition of matter comprising a solution of rubber in a liquid solvent comprising a substantial proportion of a mixture of thioethers prepared by removal of hydrogen sulphide from a mixture of the mercaptans removable from sour naphtha with an aqueous alkali.

8. Composition comprising rubber and a substantial proportion of an organic sulfide selected from the class consisting of alkyl thioethers and polysulfides.

WILLIAM SEAMAN.
GEORGE L. MATHESON.